(12) United States Patent
Belhe et al.

(10) Patent No.: US 12,032,651 B2
(45) Date of Patent: Jul. 9, 2024

(54) METHOD AND SYSTEM FOR EXTRACTING INFORMATION FROM INPUT DOCUMENT COMPRISING MULTI-FORMAT INFORMATION

(71) Applicant: Wipro Limited, Bangalore (IN)

(72) Inventors: Swapnil Dnyaneshwar Belhe, Pune (IN); Shishir Vivek Bhaskarwar, Pune (IN); Vishal Prakash Chavan, Kolhapur (IN)

(73) Assignee: Wipro Limited, Bangalore (IN)

( * ) Notice: Subject to any disclaimer, the term of this patent is extended or adjusted under 35 U.S.C. 154(b) by 0 days.

(21) Appl. No.: 17/806,955

(22) Filed: Jun. 15, 2022

(65) Prior Publication Data

US 2023/0315799 A1 Oct. 5, 2023

(30) Foreign Application Priority Data

Apr. 1, 2022 (IN) .............................. 202241020024

(51) Int. Cl.
*G06F 16/958* (2019.01)
*G06F 16/84* (2019.01)
(Continued)

(52) U.S. Cl.
CPC ............ *G06F 16/986* (2019.01); *G06F 16/84* (2019.01); *G06F 16/93* (2019.01); *G06F 40/143* (2020.01);
(Continued)

(58) Field of Classification Search
CPC ...... G06F 16/84; G06F 16/986; G06F 40/143; G06F 40/221; G06F 40/30; G06F 16/93;
(Continued)

(56) References Cited

U.S. PATENT DOCUMENTS 6,336,124 B1 * 1/2002 Alam .................... G06F 40/151
715/205
6,565,609 B1 * 5/2003 Sorge .................... G06F 16/258
707/E17.117
(Continued)

OTHER PUBLICATIONS

The global structure of an HTML document. from W3.org. Retrieved from [https://www.w3.org/TR/html401/struct/global.html] on [Apr. 20, 2023]). 16 pages. (Year: 2023).*
(Continued)

*Primary Examiner* — Nicholas Ulrich
(74) *Attorney, Agent, or Firm* — Finnegan, Henderson, Farabow, Garrett & Dunner

(57) ABSTRACT

Disclosed herein is method and a system for extracting information from an input document comprising multi-format information. In an embodiment, a Hypertext Markup Language (HTML) document corresponding to the input document is created by analyzing the input document comprising documents of multiple data formats. Further, the HTML document is realigned based on a number of columns in each page of the HTML document. Furthermore, a document Identifier (ID) associated with each of the documents is determined in realigned HTML document by classifying information in each of the document pages using a pretrained Machine Learning (ML) model. Subsequently, a hierarchy configuration file, corresponding to the realigned HTML document, is generated based on the document ID. Finally, information from the hierarchy configuration file associated with each of the document ID is extracted by orchestrating one or more data extractors for extracting data attributes from the hierarchy configuration file.

18 Claims, 7 Drawing Sheets

(51) Int. Cl.
*G06F 16/93* (2019.01)
*G06F 40/143* (2020.01)
*G06F 40/221* (2020.01)
*G06N 20/00* (2019.01)
*G06V 30/18* (2022.01)
*G06V 30/41* (2022.01)
*G06V 30/416* (2022.01)

(52) U.S. Cl.
CPC .......... *G06F 40/221* (2020.01); *G06N 20/00* (2019.01); *G06V 30/18* (2022.01); *G06V 30/41* (2022.01); *G06V 30/416* (2022.01)

(58) Field of Classification Search
CPC ..... G06F 40/137; G06F 40/258; G06V 30/18; G06V 30/416; G06V 30/41; G06N 20/00
See application file for complete search history.

(56) References Cited

U.S. PATENT DOCUMENTS

| | | | | |
|---|---|---|---|---|
| 7,310,773 | B2* | 12/2007 | Lin | G06F 40/151 715/210 |
| 7,715,635 | B1* | 5/2010 | Shagam | G06V 30/414 715/201 |
| 9,069,731 | B2* | 6/2015 | Stern | G06F 40/151 |
| 9,412,052 | B1* | 8/2016 | Natarajan | G06V 30/164 |
| 9,792,277 | B2 | 10/2017 | Srinivasan | |
| 9,946,690 | B2* | 4/2018 | Sesum | G06V 30/414 |
| 10,360,294 | B2 | 7/2019 | Phillips et al. | |
| 10,810,240 | B2* | 10/2020 | Kukla | G06F 16/93 |
| 2004/0006742 | A1* | 1/2004 | Slocombe | G06F 40/157 715/201 |
| 2007/0009161 | A1* | 1/2007 | Hollingsworth | G06V 30/40 382/229 |
| 2009/0030671 | A1* | 1/2009 | Kwon | G06F 40/42 704/2 |
| 2009/0100056 | A1* | 4/2009 | Cheng | G06F 40/143 |
| 2019/0251167 | A1* | 8/2019 | Krishnapura Subbaraya | G06N 3/045 |
| 2019/0303447 | A1* | 10/2019 | Mohiuddin Khan | G06V 30/412 |
| 2020/0005033 | A1* | 1/2020 | Bellert | G06F 16/93 |
| 2020/0074171 | A1* | 3/2020 | Gurav | G06F 18/2433 |
| 2020/0175041 | A1* | 6/2020 | Ramachandra Iyer | G06F 16/24578 |
| 2020/0242123 | A1* | 7/2020 | Venkoba | G06F 16/248 |
| 2021/0073326 | A1* | 3/2021 | Aggarwal | G06F 40/103 |
| 2022/0405503 | A1* | 12/2022 | Kaza | G06V 10/774 |

OTHER PUBLICATIONS

Cropping—definition of cropping by The Free Dictionary. Retrieved from [https://www.thefreedictionary.com/cropping] on [Apr. 20, 2023]. 3 pages. (Year: 2023).*

"Amazon Tetract", 2022, https://aws.amazon.com/textract/.

* cited by examiner

METHOD AND SYSTEM FOR EXTRACTING INFORMATION FROM INPUT DOCUMENT COMPRISING MULTI-FORMAT INFORMATION

TECHNICAL FIELD

The present disclosure, in general, relates to processing of digital documents, and particularly to a method and system for extracting information from an input document comprising multi-format information using Machine Learning (ML) models.

BACKGROUND

Every process within a company deals with files of varied formats such as PDF, TIFF, DOCX, etc., containing data in a structured or unstructured format. Collating information from different file types poses big challenge for the company. A lot of valuable information lays hidden under the unstructured data. Processing such varied sources of information with different types of formats presents its own set of challenges.

A file may contain multiple documents which are scanned together. The file can contain unrelated documents, or a hierarchy of related documents where supporting documents are attached along with a main document. Typically, each such document type has its own sets of key data points called as attributes and clauses that are valuable and need to be extracted. As it is difficult to merge multiple documents into one file, it is even more difficult to understand and demarcate the context as it overlaps due to presence of other documents, thereby creating challenges in extracting information from the documents.

Further, documents where multiple columns of text are present the text reading order gets confusing disturbing the correct reading flow of the document. Existing solutions use only computer vision techniques to detect the multicolumn data without text knowledge in it, which may lead to low detection accuracy. Also, these solutions are memory and compute intensive, which might end up as expensive solutions. Documents have distinct text and image blocks, text blocks may have section headers, sub headers, paragraphs, numbered subsections, general free flow text etc. All of this comes with top-down reading flow. Every text line in a document belongs to some text block. Identifying and aligning every text line to specific text block and building the hierarchy of all the lines in the document is critical in detecting the logical reading flow of the document; this helps in improving the attribute and clause extraction performance. The image blocks may contain diagrams, graphics, signatures which also needs to be detected and merged in the overall document hierarchy. Existing solutions detect visual paragraph blocks in scanned documents and do not deal with document structural hierarchy like heading, subheading, paragraph etc.

Also, there is need to have individual data extraction logics for every document type and its attributes and clauses. Some of the logics may use hybrid of text & image extraction mechanisms. These data extraction logics may be rule based or machine learning based, depending on the attribute and clause categories. These data extraction logics needs to be centrally orchestrated in a coordinated manner to optimally use the processing power and manage the scale of extraction process. The existing solutions do not provide a mechanism to use and control multiple extractors that can work on multiple document types to extract attributes and clauses based on hierarchy structure of the documents.

The information disclosed in this background of the disclosure section is only for enhancement of understanding of the general background of the invention and should not be taken as an acknowledgement or any form of suggestion that this information forms the prior art already known to a person skilled in the art.

SUMMARY

Disclosed herein is a method for extracting information from an input document comprising multi-format information. The method comprises creating, by a data extraction system, a Hypertext Markup Language (HTML) document corresponding to the input document by analyzing the input document. The input document in multiple data formats comprises one or more documents. Further, the method comprises realigning the HTML document based on a number of columns in each page of the HTML document. Thereafter, the method comprises determining a document Identifier (ID) associated with each of the one or more documents in realigned HTML document by classifying information in each of the one or more document pages using a pretrained Machine Learning (ML) model. Furthermore, the method comprises generating a hierarchy configuration file corresponding to the realigned HTML document based on the document ID. Finally, the method comprises extracting information from the hierarchy configuration file associated with each of the document ID by orchestrating one or more Machine Learning (ML) and/or rules-based data extractors for extracting data attributes from the hierarchy configuration file.

Further, the present disclosure relates to a data extraction system for extracting information from an input document comprising multi-format information. The data extraction system comprises a processor and a memory. The memory is communicatively coupled to the processor and stores processor-executable instructions, which on execution, cause the processor to create a Hypertext Markup Language (HTML) document corresponding to the input document by analyzing the input document. The input document comprises one or more data formats. Further, the instructions cause the processor to realign the HTML document based on a number of columns in each page of the HTML document. Thereafter, the instructions cause the processor to determine a document Identifier (ID) associated with each of the one or more documents in realigned HTML document by classifying information in each of the one or more documents using a pretrained Machine Learning (ML) model. Furthermore, the instructions cause the processor to generate a hierarchy configuration file corresponding to the realigned HTML document based on the document ID. Finally, the instructions cause the processor to extract information from the hierarchy configuration file associated with each of the document ID by orchestrating one or more Machine Learning (ML) and/or rules-based data extractors for extracting data attributes from the hierarchy configuration file.

Furthermore, the present disclosure relates to a non-transitory computer readable medium including instructions stored thereon that when processed by at least one processor, cause a data extraction system to perform operations comprising creating a Hypertext Markup Language (HTML) document corresponding to the input document by analyzing and processing the input document. The input document in multiple data formats comprises one or more documents. Further, the instructions cause the processor to realign the HTML document based on a number of columns in each page of the HTML document. Thereafter, the instructions cause the processor to determine a document Identifier (ID) associated with each of the one or more documents in realigned HTML document by classifying information in each of the one or more document pages using a pretrained Machine Learning (ML) model. Furthermore, the instructions cause the processor to generate a hierarchy configuration file corresponding to the realigned HTML document based on the document ID. Finally, the instructions cause the processor to extract information from the hierarchy configuration file associated with each of the document ID by orchestrating one or more Machine Learning (ML) and/or rules-based data extractors for extracting data attributes from the hierarchy configuration file.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF DRAWINGS

The accompanying drawings, which are incorporated in and constitute a part of this disclosure, illustrate exemplary embodiments and, together with the description, explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and regarding the accompanying figures, in which.

Figure 1:
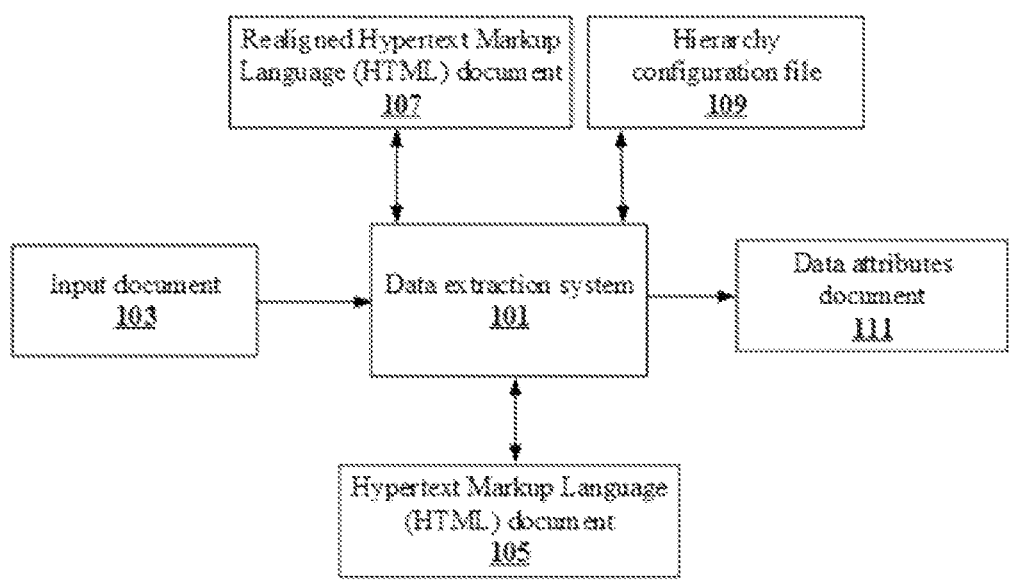
FIG. 1 shows an overview of functioning of a data extraction system in accordance with some embodiments of the present disclosure.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

In an embodiment, the present disclosure proposes a method that extracts information from an input document comprising multi-format information. In an embodiment, the present disclosure detects whether the input document is a text document or a scanned document. In an embodiment, when the input document is the scanned document, the present disclosure converts each page of the input document into an image and performs data pre-processing operations. The data preprocessing operations comprises assessing a quality of the one or more images, detecting a text region and a non-text region in the one or more images, detection of page orientation, correction of page orientation, detection of image skew, correction of image skew, detecting text words and recognizing characters in the text portion of the one or more images using Optical Character Recognition (OCR). The present disclosure creates a Hypertext Markup Language (HTML) document by combining OCR text and non-text image portion from scanned document.

In another embodiment, when the input document may comprise the text document, the HTML document is created directly from text portions of the input document. The HTML document may contain more than one column. Using combination of rules and a pretrained Machine Learning (ML) model, the number of columns in each page of the HTML document is predicted. Further, a document Identifier (ID) associated with each of the one or more documents in realigned HTML document is determined by classifying information in each of the one or more document pages using the pretrained Machine Learning (ML) model. Based on the document ID, a hierarchy configuration file corresponding to the realigned HTML document is generated. The data extraction system extracts information from the hierarchy configuration file associated with each of the document ID by orchestrating one or more Machine Learning (ML) and/or rules-based data extractors for extracting data attributes from the hierarchy configuration file. From the hierarchy configuration file information associated with each of the document ID is extracted by orchestrating one or more data extractors for extracting data attributes from the hierarchy configuration file. The data extraction system aggregates the information by combining the output from one or more dependent data extractors and independent data extractors. Finally, according to the present disclosure the output of the one or more dependent data extractors and independent data extractors is a data attributes document comprising extracted key data points, clauses, co-ordinate information and confidence level for attributes and/or clauses.

In an embodiment, the proposed method aims for creating free flowing text in files that contain documents of multiple types, determining the layout and logical breaking of the documents and extracting relevant information from the documents. Also, the proposed invention helps in understanding the hierarchical structure of multiple documents present in a file and arranging the document in the hierarchical order.

FIG. 1 shows an overview of functioning of a data extraction system, in accordance with some embodiments of the present disclosure.

In an embodiment, the data extraction system 101 may be a computing system including, without limiting to, a desktop computer, a laptop, a smartphone and the like. The data extraction system 101 may be configured and used for extracting information from an input document 103 comprising multi-format information. The input document 103 may comprise multiple documents scanned together, the scanned documents may be unrelated to each other or may be supporting documents attached to the main document. Further, the input document 103 may comprise one or more documents of multiple data formats. As an example, the one or more documents of multiple data formats may comprise documents like research papers, legal contracts, marriage certificates, birth certificates etc. The input document 103 may be provided to the data extraction system 101, by a user or the input document 103 may be automatically picked up by the data extraction system 101 when the input document 103 may be available in a predefined folder. A user may include, without limiting to, an employee at a government office, an employee at an insurance office, or any user who wants to extract information from the document. The input document 103 should be in an acceptable format. As an example, the acceptable format may include but not limiting to Portable Document Format (PDF), Joint Photographic Experts Group (JPEG) format, Tagged Image File Format (TIFF), Word Document (DOCX) format, and the like.

In an embodiment, the data extraction system 101 detects, using a plurality of parsers, whether the input document 103 is a scanned document and/or a text document by counting number of words in each page. In an embodiment, when the input document 103 may be a scanned document, the data extraction system 101 pre-processes the input document 103 by converting each page of the input document 103 into one or more images. The one or more images are further processed by performing actions comprising assessing a quality of the one or more images, detecting a text region and a non-text region in the one or more images, detection of page orientation, correction of page orientation, detection of image skew, correction of image skew, detecting text words and recognizing characters in the text portion of the one or more images. For example, Optical Character Recognition (OCR) technique may be used to recognize texts in the one or more images.

In an embodiment, after processing the input document 103, the data extraction system 101 may create a Hypertext Markup Language (HTML) document 105 by combining the characters recognized in the text region and non-text region for the scanned document. In another embodiment, when the input document 103 may comprise the text document, the data extraction system 101 may create the HTML document 105 directly from the text portions of the input document 103. The HTML document 105 may contain multiple pages that contains the text and as well as the properties of the text (such as spatial information of words) that were obtained from the one or more images during OCR. If there are any spelling errors in the HTML document 105, the spelling errors are corrected at word level and properties of the text, such as word Identifier (ID), are used to identify the sequence of words in the text. A sequence for each word is created and the sequence is used to perform the spell correction. Further, the data extraction system 101 realigns the HTML document 105 based on a number of columns in each page of the HTML document 105. Further, the data extraction system 101 may remove any unwanted texts like page numbers, boarder noise from each page of the HTML document 105 by cropping a predefined region from all sides of each page of the HTML document 105. Furthermore, the data extraction system 101 may calculate a distance between two consecutive words for each set of words in each page based on predefined text metadata. As an example, the predefined text metadata may include, without limiting to, a word ID, a Bounding Box co-ordinate (BBox), etc. A plurality of clusters of words is created based on features calculated by using text metadata, distance between consecutive words, mean and standard deviation of word distances. As an example, for creating clustering of words, an unsupervised and a supervised algorithms like k-means, Convolution Neural Network (CNN) or similar are used.

In an embodiment, after creating the HTML document 105, the data extraction system may realign the HTML document 105. The HTML document 105 is realigned by sorting one or more words in the HTML document 105 from left-to-right and top-to-bottom of each page for non-Arabic & non Perso-Arabic languages and from right-to-left and top-to-bottom for Arabic and Perso-Arabic languages. The sorting is based on properties associated with each of the one or more words for determining line information. The data extraction system 101 may use a pretrained ML model to predict if the one or more words is a starting word of a line within each column using the line information. Further, the data extraction system 101 creates a realigned HTML document 107 using the line information and the start word information. The realigned HTML document 107 may comprise one or more documents scanned together, the scanned documents may be unrelated to each other or may be supporting documents attached to the main document. Further, the realigned HTML document 107 may comprise one or more documents of multiple data formats. As an example, the one or more documents of multiple data formats may comprise documents like government ID proofs, research papers, legal contracts, marriage certificates, birth certificates etc.

In an embodiment, after creating the realigned HTML document 107, the data extraction system determines a document Identifier (ID) associated with each of the one or more documents in the realigned HTML document 107 by classifying information in each of the one or more document pages using a pretrained ML model. The set of predetermined rules may be used to determine the document ID and the set of predetermined rules may be co-ordinate of line, line height information, uppercase letters, lowercase letters, special characters, numbers in starting lines etc. Further, the data extraction system 101 generates a hierarchy configuration file 109 corresponding to the realigned HTML document 107 based on the document ID. In the hierarchy configuration file 109, at least one heading category is determined for each line. The heading category may comprise at least one of a main heading, a sub-heading or a main section and a sub-section or a main paragraph and a sub-paragraph. Each line is arranged according to the at least one heading category in the hierarchy configuration file 109.

In an embodiment, after determining the document Identifier (ID) associated with each of the one or more documents in the realigned HTML document 107, the data extraction system 101 extracts information from the input document 103 by extracting information from the hierarchy configuration file 109 associated with each of the document ID by orchestrating one or more data extractors for extracting data attributes from the hierarchy configuration file 109. The one or more data extractors may be a dependent data extractor and/or an independent data extractor. Also, the one or more data extractors may be rule based data extractors and/or ML based data extractors. The document ID is used to determine the one or more data extractors for extracting information from the hierarchy configuration file 109. The document ID is also used to split the hierarchy configuration file 109 into a plurality of split hierarchy configuration files. From the split hierarchy configuration files, the data extraction system 101 extracts one or more text attributes, one or more image attributes and one or more text clauses. In case if the data extraction system 101 identifies features like signatures, handwritten text, handwritten dates in the documents, a deep learning-based object detections algorithms like Single Shot detection (SSD), Faster Region based Convolutional Neural Network (FRCNN) are used at each page level. This is required to extract date information, which is generally handwritten in certain documents like contracts. Finally, the data extraction system aggregates the information extracted by the one or more data extractors in a data attributes document 111 comprising extracted key data points, clauses, co-ordinate information and confidence level for attributes and/or clauses.

Figure 2:
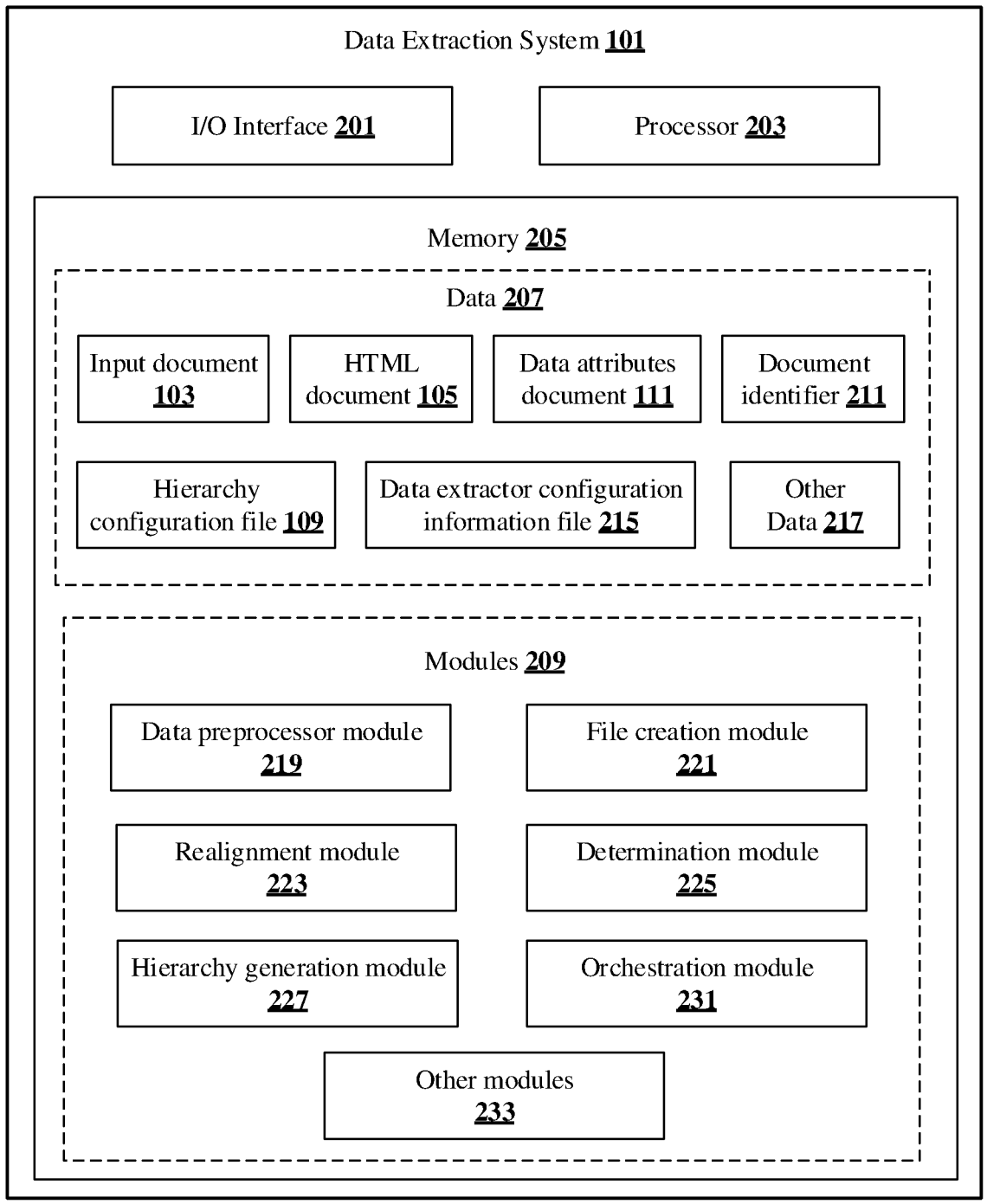
FIG. 2 shows a detailed block diagram of the data extraction system in accordance with some embodiments of the present disclosure.

FIG. 2 shows a detailed block diagram of a data extraction system 101 in accordance with some embodiments of the present disclosure.

In an embodiment, the data extraction system 101 may include an I/O interface 201, a processor 203 and a memory 205. The processor 203 may be configured to perform one or more functions of the data extraction system 101 for extracting information from an input document 103 comprising multi-format information, using the data 207 and the one or more modules 209 in stored in a memory 205 of the data extraction system 101. In an embodiment, the memory 205 may store data 207 and one or more modules 209.

In an embodiment, the data 207 may be stored in the memory 205 may include, without limitation, input document 103, a Hypertext Markup Language (HTML) document 105, a document Identifier (ID) 211, a hierarchy configuration file 109, data attributes document 111, data extractor configuration information file 215 and other data 217. In some implementations, the data 207 may be stored within the memory 205 in the form of various data structures. Additionally, the data 207 may be organized using data models, such as relational or hierarchical data models. The other data 217 may include various temporary data and files generated by the one or more modules 209.

In an embodiment, the input document 103 is a document uploaded by a user from which the information must be extracted by the data extraction system 101. The input document 103 may be a Government ID proofs, research papers, legal contracts, marriage certificates, birth certificates etc. The input document 103 should be in an acceptable format. For example, the acceptable format may be Portable Document Format (PDF), Joint Photographic Experts Group (JPG), Tagged Image File Format (TIFF), Word Document (DOCX), etc. In an embodiment, the input document 103 may be a scanned document and/or a text document.

In an embodiment, the HTML document 105 is a document created by the file creation module 221. The input document 103 may be a text document and/or a scanned document. In an embodiment, when the input document 103 may be the scanned document, the HTML document 105 is created after the Optical Character Recognition (OCR) is performed on the text portion of the images of the input document 103. In another embodiment, when the input document 103 may be the text document, the file creation module 221 creates the HTML document 105 from text portions of the input document 103. The HTML document 105 may contain multiple pages that may contain the text and image blocks as well as the properties of the text (such as spatial information of words) and images (positional information of image blocks).

In an embodiment, the document ID 211 is an identifier used to identify each of the one or more documents in the realigned HTML document 107 by classifying information in each of the one or more document pages using a pre-trained Machine Learning (ML) model. The document ID 211 is used to extract all lines for each document in the realigned HTML document 107. The one or more data extractors for extracting the data are selected based on the information of the document ID 211. The document ID 211 may also be used for aggregating all the documents after data extraction.

In an embodiment, the data attributes document 111 is a document which comprises a set of key data points for each type of document, clauses, co-ordinate information and confidence level for attributes and/or clauses. In an embodiment, the information extracted by the one or more data extractors is aggregated in the data attributes document 111.

In an embodiment, the hierarchy configuration file 109 is a file that contains all the text information classified under different categories. The hierarchy configuration file 109 contains the information in a hierarchical structure and free flowing text in the document. Each line in the hierarchy configuration file 109 may be categorized as a main-heading, sub-heading, sub-section, paragraph, sub-paragraph etc.

In an embodiment, the data extractor configuration information file 215 is a file that contains key system level information and data extractors level information for each document type. In an embodiment, based on the data extractor configuration information file 215, the hierarchy configuration file 217 is split at document level based on the information such as document ID 211.

In an embodiment, the data 207 may be processed by the one or more modules 209 of the data extraction system 101. In some implementations, the one or more modules 209 may be communicatively coupled to the processor 203 for performing one or more functions of the data extraction system 101. In an implementation, the one or more modules 209 may include, without limiting to, a data preprocessor module 219, a file creation module 221, a realignment module 223 a determination module 225, a hierarchy generation module 227, an orchestration module 231 and other modules 233.

In an implementation, each of the one or more modules 209 may be configured as stand-alone hardware computing units. In an embodiment, the other modules 233 may be used to perform various miscellaneous functionalities of the data extraction system 101. It will be appreciated that such one or more modules 209 may be represented as a single module or a combination of different modules.

In an embodiment, the data preprocessor module 219 may be configured for preprocessing the input document 103. The data preprocessor module 219 identifies the format or the type of the input document 103. If the file format is an acceptable format, the file is processed further, otherwise the file is rejected. For example, the acceptable format may be at least one of Portable Document Format (PDF), Joint Photographic Experts Group (JPG), Tagged Image File Format (TIFF), Word Document (DOCX) etc. The input document 103 can be a single page document or a document comprising multiple pages. Also, the input document 103 may be a document of single document type or a document comprising multiple documents of different document types.

In an embodiment, the input document 103 may be a text document and/or scanned document. The data preprocessor module 219 detects using a plurality of parsers whether the input document 103 is a scanned document and/or a text document by counting number of words in each page. Further, the data preprocessor module 219 breaks down the input document 103 at page level and converts each page of the input document 103 to an image. The data preprocessor module 219 identifies the quality of the input document 103 and determines quality score for each image. The quality score of each image is combined to determine a quality score for the input document 103. If the quality score of the input document 103 is above or equal to a predefined threshold score, the input document 103 is processed further. If the quality score of the input document 103 is below the predefined threshold score, the input document 103 is forwarded for manual review. The data preprocessor module 219 determines where the text portion is present within each image and where non-text portion is present. The text portion is defined as the portion of the image where only text is present and the non-text portion is defined as the portion of the image where figures, tables, plots, graphs etc. may be present. Furthermore, depending on the quality of the images, the data preprocessor module 219 performs preprocessing on the images. The preprocessing on images may implement sub-modules such as detection of page orientation, correction of page orientation, detection of image skew, correction of image skew, detecting text words and recognizing characters in the text portion of the one or more images using Optical Character Recognition (OCR).

In an embodiment, the file creation module 221 may be configured for creating, a Hypertext Markup Language (HTML) document 105 corresponding to the input document 103 by analyzing the input document 103. The file creation module 221 creates a HTML document 105 by combining text after Optical Character Recognition (OCR) and non-text i.e., image portion for scanned document along with text metadata. In an embodiment, when the input document 103 may be a text document the file creation module 221 creates the HTML document 105 directly from text portions of the input document 103 without data preprocessing. The file creation module 221 handles any spelling errors in the HTML document 105 and corrects spelling errors at word level. The file creation module 221 uses properties of the text such as word Identifier (ID) to identify the sequence of words in text. A sequence for each word is created and file creation module 221 uses the sequence to perform spell correction.

In an embodiment, the realignment module 223 realigns the HTML document 105 based on a number of columns in each page of the HTML document 105. The realignment module 223 identifies the number of columns present on each page of the HTML document 105. The realignment module 223 crops a predefined region from all sides of each page of the HTML document 105 for removing noise from page borders, headers and footers. Further, based on the number of columns and properties of the text, such as spatial information of the words, the realignment module 223 realigns the HTML document 105. The realignment module 223 calculates distance for all the consecutive words and creates a list at page level and calculates mean and standard deviation of distance from the list and identifies mean and standard deviation related features. Thereafter, the realignment module 223 traverses through each line of the page and calculates the number of distances that are higher than mean, the number of distances that are higher than mean plus one standard deviation and the number of distances that are higher than mean plus two standard deviations. Further, the realignment module 223 normalizes the number of distances with respect to the number of lines. Here, the realignment module 223 uses unsupervised and supervised algorithms like k-means and convolutional neural network or similar algorithms to create two clusters and identifies the distances belonging to each cluster. In an embodiment, the first cluster may be an inter-word cluster and the second cluster may be an inter-column cluster. Furthermore, the realignment module 223 uses an ensemble of pretrained machine learning models and a neural network like a Convolution Neural Network (CNN) classifier to predict whether the page has a single column or multiple columns. The realignment module 223 predicts the number of columns on each page based on the mean and standard deviation related features, cluster information and column information.

The realignment module 223 then realigns the HTML document 105 to create a realigned HTML document 107. The realignment module 223 triggers realignment logic if number of columns predicted is more than one. The realignment module 223 uses the properties of the text and sorts the words in the HTML document 105 from left to right and top to bottom for non-Arabic & non Perso-Arabic languages and from right-to-left and top-to-bottom for Arabic and Perso-Arabic languages. Using the spatial information from surrounding words, word related features, such as distance and slopes, are calculated. Further, the trained machine learning model and calculated features are used to predict whether a word is a start word or not. The realignment module 223 creates a realigned HTML document 107 from the HTML document 105 using line information and start word related information. The realignment module 223 groups words in each line using start word related information, and clubs the lines under the columns In case there is a text which runs over the columns, the realignment module 223 assigns the text to one of the columns using common words.

In an embodiment, the determination module 225 determines a document Identifier (ID) 211 associated with each of the one or more documents in realigned HTML document 107 by classifying information in each of the one or more document pages using a pretrained Machine Learning (ML) model. The determination module 225 identifies the types of documents present within the realigned HTML document 107. For example, the types of documents may include government IDs, research papers, legal contracts, marriage certificates, birth certificates etc. For each page, hybrid of text classification and image classification are done using Machine Learning (ML) and/or Rule based techniques. The determination module 225 updates document ID 211 information in the realigned HTML document 107.

In an embodiment, the hierarchy generation module 227 generates a hierarchy configuration file 217 corresponding to the realigned HTML document 107 based on the document ID 211. The hierarchy generation module 227 identifies the hierarchical structure information of the documents of the realigned HTML document 107 to create free flowing text in the document at line level. The free flowing text is required for building the right context for the extractor modules to identify text clauses and data attributes. The hierarchy generation module 227 uses the document type and the document ID 211 information to extract all lines for each document in the realigned HTML document 107. A plurality of features is determined for each line. The plurality of features may include co-ordinate of line, indentations, change in font style, boldness, line height information, uppercase letters, lowercase letters, special characters, numbers in starting lines etc. The hierarchy generation module 227 uses a pretrained machine learning model on the plurality of features to categorize each line into a category. For example, the category may include at least one of a main heading, a sub-heading, a sub-section, a paragraph, a sub-paragraph etc. The hierarchy generation module 227 also uses the plurality of features of one or more lines above and below each line for classification of each line to a category. The hierarchy generation module 227 groups and/or separates lines based on the result of the classification. For example, if multiple lines are consecutively classified under sub-section, they are grouped together by the hierarchy generation module 227. The hierarchy generation module 227 generates a hierarchy configuration file 109 that contains all the text information classified under different categories. The hierarchy configuration file 109 also includes information such as document ID 211, properties of the text etc.

In an embodiment, the orchestration module 231 extracts information from the hierarchy configuration file 109 associated with each of the document ID 211 by orchestrating one or more data extractors for extracting data attributes from the hierarchy configuration file 109. The orchestration module 231 uses one or more data extractors to extract relevant information from the documents. There are multiple data extractors which are required to extract information from multiple documents present within the input document 103. In few scenarios, multiple data extractors are also required for single type of document, this typically happens when there are large number of data attributes and text clauses to be extracted. The one or more data extractors can be broadly classified into two groups. The first group is of independent data extractors, which do not need information from any other data extractors. The independent data extractors can be executed in parallel. The second group is of dependent data extractor, which need some prior information from other data extractors to complete their task. To extract complete information, the execution order of dependent data extractors needs to be arranged in a pre-defined sequence. Also, the one or more data extractors may be rule based data extractors and/or Machine Learning (ML) based data extractors. The data extractors may be automated data extraction engines. For example, consider a scenario where an input document 103 comprises multiple documents such as a covering letter, a Purchase Order (PO) and invoice. For each document type, there are separate data extractors. The invoice attributes like product descriptions, quantity, unit price etc. may be extracted automatically using the ML based data extractor. Similarly for each document type there may be separate data extractors.

The orchestration module 231 receives hierarchy configuration file 217 from the hierarchy generation module 227. The orchestration module 231 determines data extractors configuration information associated with the independent data extractors and dependent data extractors from a pre-defined data extractors configuration information file 215. The data extractors configuration information file 215 contains key system level information and data extractors level information for each document type. Based on the data extractors configuration information the orchestration module 231 splits the hierarchy configuration file 109 at document level based on the information such as document type and document ID 211. The orchestration module 231 provides the split hierarchy configuration files to the data extractors for extraction of data attributes and text clauses. Based on the data extractors configuration information, the orchestration module 231 controls one or more data extractors to extract attributes and clauses from the split hierarchy configuration file for each document. Independent data extractors are executed in parallel, while dependent data extractors are executed as per their execution order. The orchestration module 231 aggregates the data attributes and text clauses from the one or more data extractors in a pre-defined format. After execution of all the data extractors, all the extracted and received data attributes and text clauses are aggregated for the documents based on information such as document ID 211. The orchestration module 231 uses split hierarchy configuration files to ascertain that the orchestration module 231 has received responses for all the documents from the one or more data extractors. Finally, the orchestration module 231 aggregates the information extracted by the one or more data extractors in a data attributes document 111 comprising extracted key data points, clauses, co-ordinate information and confidence level for attributes and/or clauses.

In an embodiment, an additional module for recognizing signature and/or handwritten texts which may be optionally required. This additional module identifies features like signatures, handwritten text, handwritten dates in the documents, a deep learning-based object detections algorithms and handwritten recognition algorithms like Single Shot detection (SSD), Faster Region based Convolutional Neural Network (FRCNN), Convolution Recurrent Neural Networks are used. This additional module is required to extract information like handwritten dates, signatures, stamps, logo etc. which are generally critical attributes in certain documents like contracts.

Figure 3A:
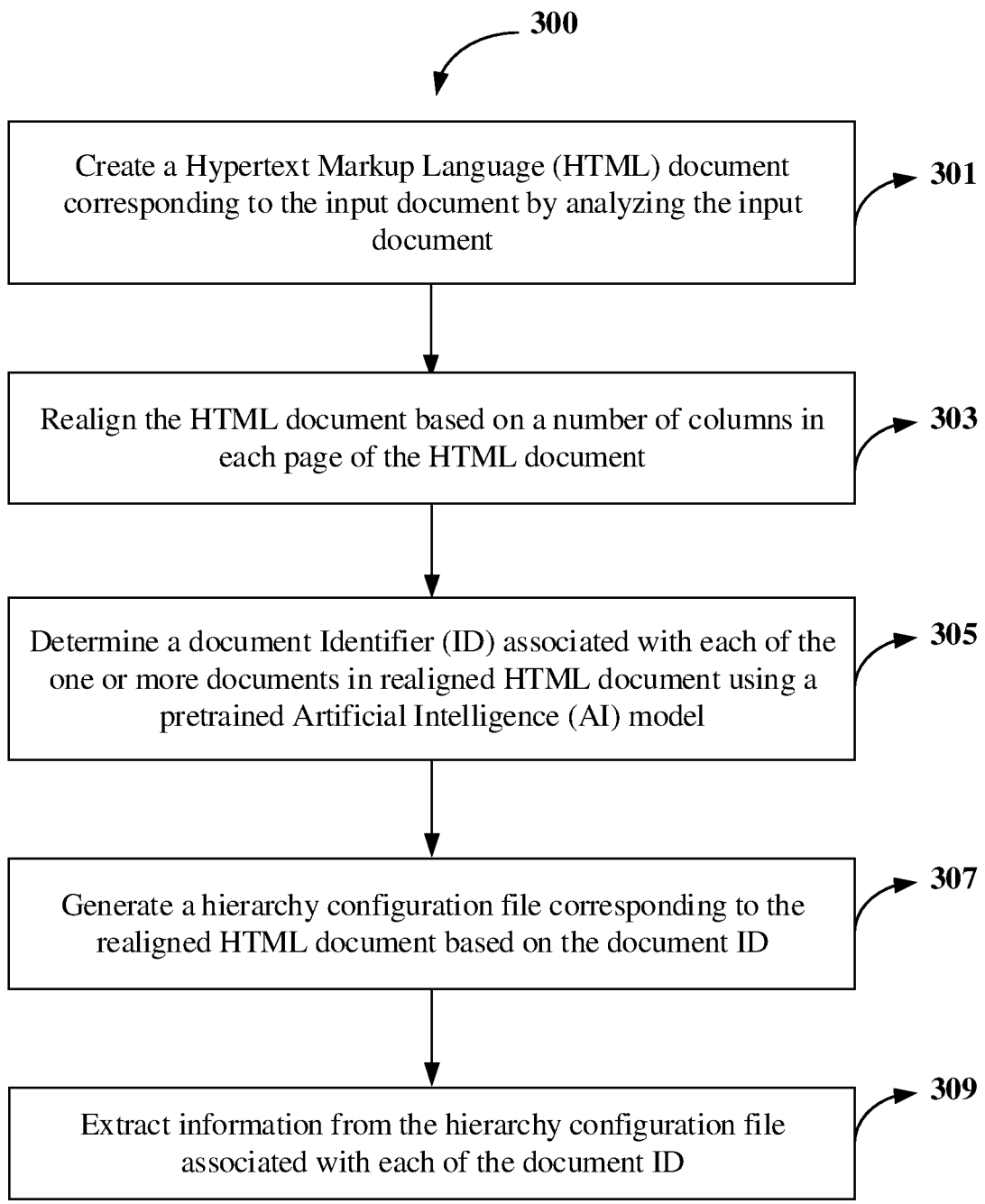
FIG. 3A shows a flowchart illustrating a method for extracting information from an input document comprising multi-format information, in accordance with some embodiments of the present disclosure.

FIG. 3A shows a flowchart illustrating a method for extracting information from an input document 103 comprising multi-format information in accordance with some embodiments of the present disclosure.

As illustrated in FIG. 3A, the method 300 may include one or more blocks illustrating a method for extracting information from an input document 103 comprising multi-format information using a data extraction system 101 illustrated in FIG. 2.

At block 301, the method 300 includes creating, by the data extraction system 101, a Hypertext Markup Language (HTML) document 105 corresponding to the input document 103 by analyzing the input document 103. In an embodiment, the input document 103 comprises one or more documents of multiple data formats. The file format of the input document is validated. In an embodiment, when the input document 103 is the scanned document, each page of the input document 103 may be converted into an image and data pre-processing operations is performed on each of the one or more images for validating the information. For example, the one or more data pre-processing operations may comprise assessing a quality of the one or more images, detecting a text region and a non-text region in the one or more images, detection of page orientation, correction of page orientation, detection of image skew, correction of image skew, detecting text words and recognizing characters in the text portion of the one or more images. Finally, the information is rendered into the HTML document 105. In another embodiment, when the input document 103 only comprises of the text document, then the HTML document 105 is created directly from the text portions of the input document 103.

At block 303, the method 300 includes realigning, by the data extraction system 101 the HTML document 105 based on a number of columns in each page of the HTML document 105. In an embodiment, a predefined region from all sides of each page are cropped. A distance between two consecutive words for each set of words in each page is calculated based on predefined text metadata. For example, the predefined text metadata may comprise word Identifier (ID), Bounding Box (BBox), etc. Further, a plurality of clusters of words is created based on a mean and a standard deviation of the distance. Finally, the number of columns in each page is predicted by analyzing the plurality of clusters using the pre-trained Machine Learning (ML) model.

At block 305, the method 300 includes determining, by the data extraction system 101, a document Identifier (ID) 211 associated with each of the one or more documents in realigned HTML document 107 by classifying information in each of the one or more document pages using a pre-trained Machine Learning (ML) model. In an embodiment, one or more words in the HTML document 105 are sorted from left-to-right and top-to-bottom of each page based on properties associated with each of the one or more words for determining line information. Further, it is predicted if the one or more words is a starting word of a line within each column by analysing the line information using the pre-trained Artificial Intelligence (AI) model. The realigned HTML document 105 is created using the line information and the start word.

At block 307, the method 300 includes generating, by the data extraction system 101, a hierarchy configuration file 109 corresponding to the realigned HTML document 107 based on the document ID 211. In an embodiment, a plurality of text features is determined for each line in the realigned HTML document 107. Further, based on the plurality of text features corresponding to each line at least one heading category to each line is determined. For example, the heading category comprises at least one of a main heading, a sub-heading or a main section and a sub-section or a main paragraph and a sub-paragraph. Each line according to determined heading category is arranged and the hierarchy configuration file 109 is generated according to arrangement of each line.

At block 309, the method 300 includes extracting, by the data extraction system 101, information from the hierarchy configuration file 109 associated with each of the document ID 211. In an embodiment, one or more extractors for extracting information is determined from the hierarchy configuration file 109 based on the document ID 211. The hierarchy configuration file 109 is split into a plurality of split hierarchy configuration files corresponding to each document ID 211. Further, one or more text attributes, one or more image attributes and one or more text clauses are extracted from the split hierarchy configuration files and the information extracted by each of the one or more extractors is aggregated into an data attributes document 111. The data attributes document 111 comprises extracted key data points, clauses, co-ordinate information and confidence level for attributes and/or clauses.

Figure 3B:
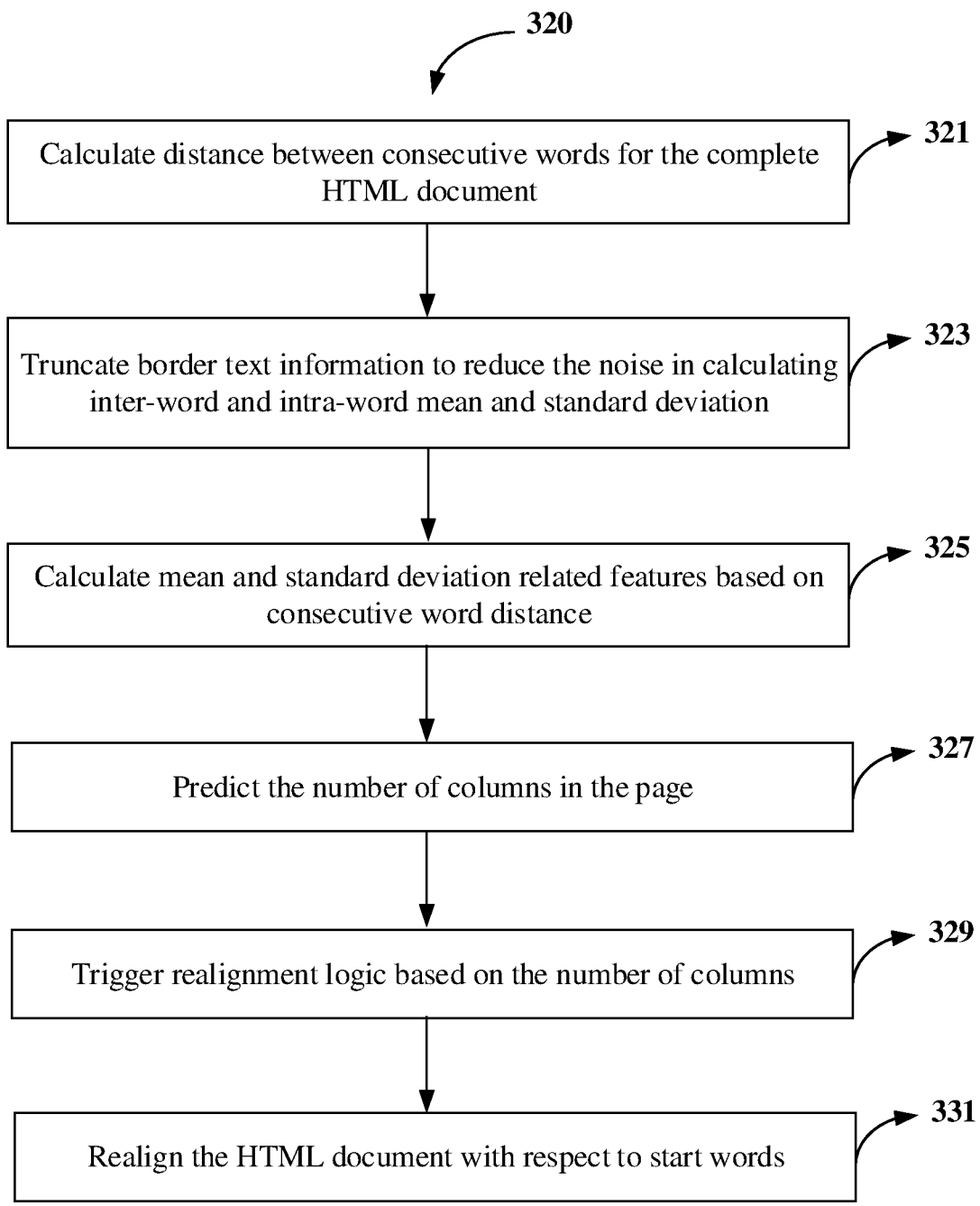
FIG. 3B shows a flowchart illustrating a method for identifying multiple columns and realigning a HTML document in accordance with some embodiments of the present disclosure.

FIG. 3B shows a flowchart illustrating a method for identifying multi columns and realigning HTML document 105 in accordance with some embodiments of the present disclosure.

At block 321, the method 320 includes calculating, by the data extraction system 101, a distance between consecutive words in the HTML document 105. In an embodiment, a predefined region from all sides of each page of the HTML document 105 is removed so as not to include any unwanted text, for example page number at the bottom or at the top of each page. Further, for each page, a distance between two consecutive words is calculated using properties like word identifier (ID), bounding box (BBox) etc. The distance between two consecutive words is calculated for all the consecutive words in the HTML document 105 and a list of words is created at page level.

At block 323, the method 320 includes truncating, by the data extraction system 101, a border text information to reduce the noise in calculating inter-word and intra-word mean and standard deviation. In an embodiment, the data extraction system 101 may remove any unwanted texts like page numbers, boarder noise from each page of the HTML document 105 by cropping a predefined region from all sides of each page of the HTML document 105.

At block 325, the method 320 includes calculating, by the data extraction system 101, a mean and a standard deviation related features based on consecutive word distance. In an embodiment, the mean and the standard deviation of distance is calculated from the list of words created at page level for each page. In an embodiment, each line of the page is traversed, the number of distances higher than mean, the number of distances higher than mean plus one standard deviation and the number of distances higher than mean plus two standard deviations are calculated. Further, normalization of the number of distances are done with respect to the number of lines.

At block 327, the method 320 includes predicting, by the data extraction system 101, the number of columns in each page. In an embodiment, a pre-trained Machine Learning (ML) model, for example k-means algorithm, is used to create two clusters which help in identifying whether the distances belong to inter word cluster or inter column cluster. Further, an ensemble of pre-trained machine learning models and a neural network like, Convolutional Neural Network (CNN) classifier, is used to predicted whether the page has a single column or multiple columns. In an embodiment, based on the mean and standard deviation related features, cluster information and column information, the number of columns on each page are predicted.

At block 329, the method 320 includes triggering, by the data extraction system 101, a realignment logic based on the number of columns. In an embodiment, if number of columns predicted is more than one, realignment logic is triggered, and the HTML document 105 is realigned accordingly.

At block 331, the method 320 includes realigning, by the data extraction system 101, the HTML document 105 with respect to start words identified. In an embodiment, using information about lines and start word related information, the text in the HTML document 105 is realigned to create a realigned HTML document 107. Further, the word in each line is grouped using the start word related information, the lines are then clubbed under columns and the text which runs over columns is assigned to one of the columns using common words.

Figure 3C:
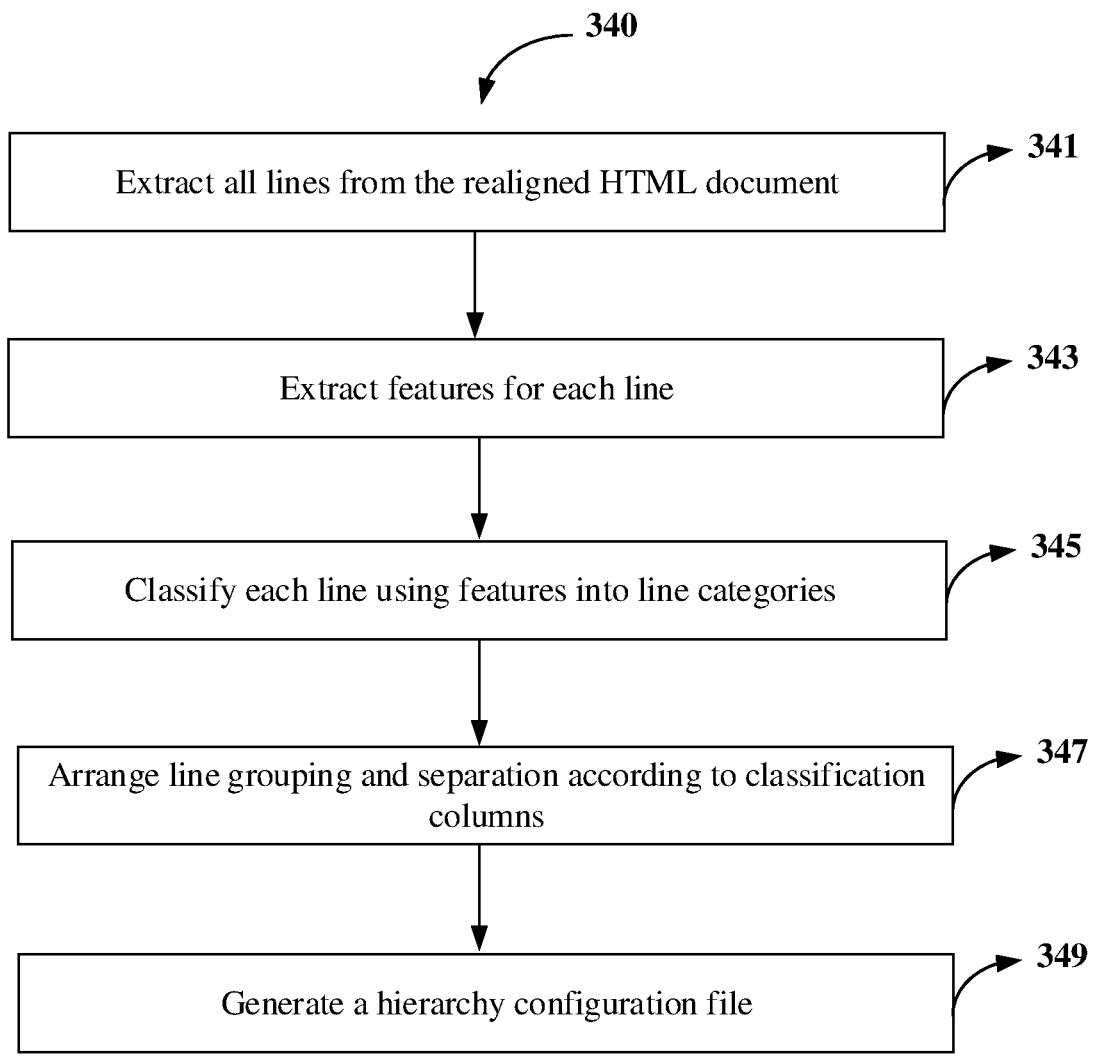
FIG. 3C shows a flowchart illustrating a method for detecting hierarchical structure of the realigned HTML document in accordance with some embodiments of the present disclosure.

FIG. 3C shows a flowchart illustrating a method for generating hierarchical structure of the realigned HTML document 107 in accordance with some embodiments of the present disclosure.

At block 341, the method 340 includes extracting, by the data extraction system 101, all lines from the realigned HTML document 107. In an embodiment, using document type and document Identifier (ID) 211 information, the lines are extracted for each document in the realigned HTML document 107.

At block 343, the method 340 includes extracting, by the data extraction system 101, a plurality of features for each line. In an embodiment, the plurality of features may include at least one or combination of co-ordinate of line, line height information, uppercase letters, lowercase letters, special characters, numbers in starting lines etc.

At block 345, the method 340 includes classifying, by the data extraction system 101, each line using features into line categories. In an embodiment, using a pretrained machine learning model on the plurality of features of each line, each line is categorized into a category. For example, the category may be main-heading, sub-heading, sub-section, paragraph, sub-paragraph etc. In an embodiment, during the classification of a line, features of one or more lines above the line and below the line are also used.

At block 347, the method 340 includes arranging, by the data extraction system 101, line grouping and separation according to classification columns. In an embodiment, based on the result of the classification, lines are grouped or separated. For example, if multiple lines are consecutively classified under sub-section, they are grouped together.

At block 349, the method 340 includes generating, by the data extraction system 101, a hierarchy configuration file 109. In an embodiment, a hierarchy configuration file 109 is generated, that contains all the text information classified under different categories. The hierarchy configuration file 109 also includes information such as document type, document ID 211, properties of the text etc.

Figure 3D:
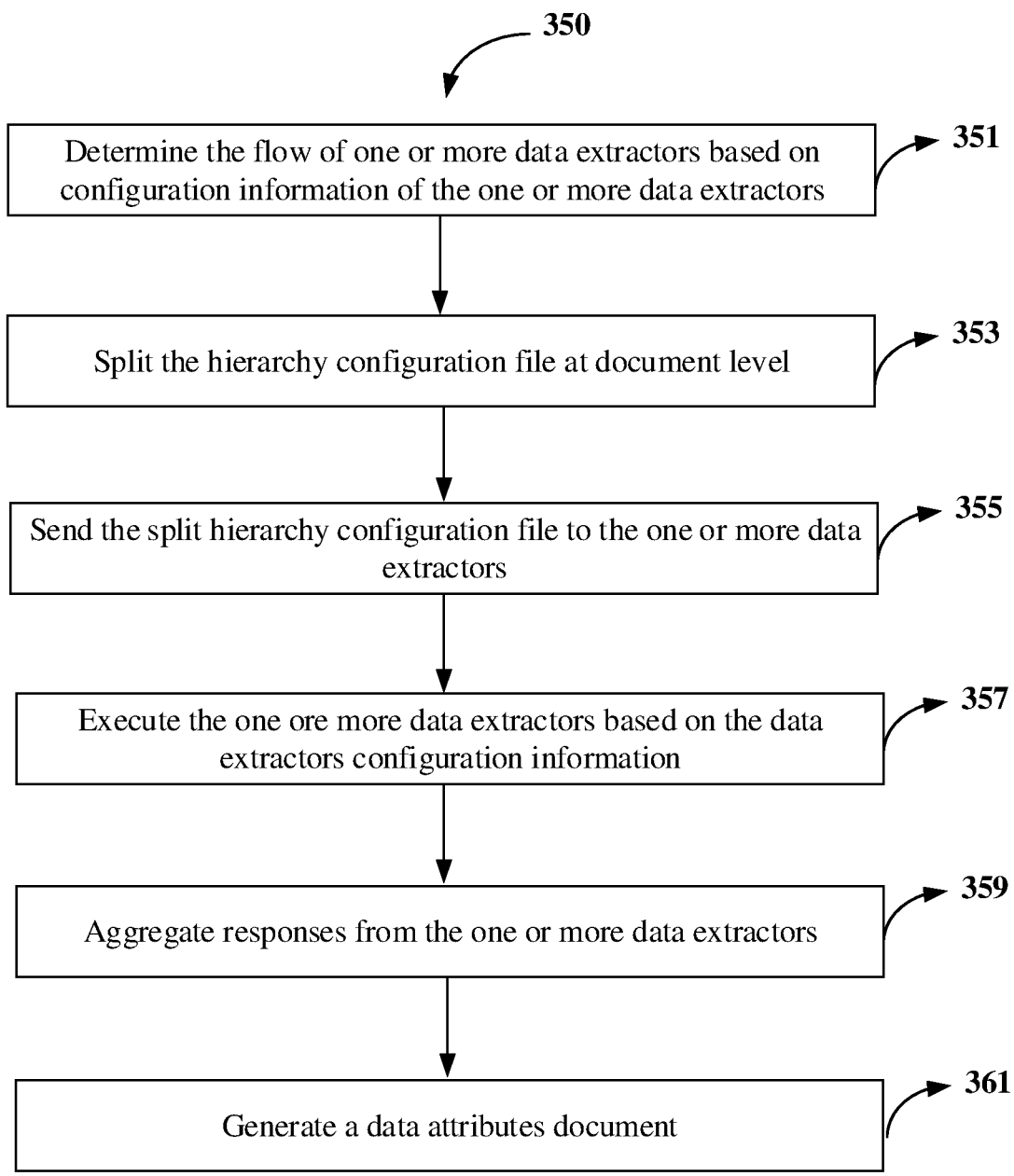
FIG. 3D shows a flowchart illustrating a method for orchestrating data extractors for extracting data attributes and data clauses in accordance with some embodiments of the present disclosure.

FIG. 3D shows a flowchart illustrating a method for orchestrating one or more data extractors for extracting data attributes and data clauses in accordance with some embodiments of the present disclosure.

At block 351, the method 350 includes determining, by the data extraction system 101, the flow of one or more data extractors based on configuration information of the one or more data extractors. In an embodiment, the execution configuration information of independent and dependent data extractors is determined from the data extractor configuration information file 215. The data extractors configuration information file 215 contains key system level information and data extractors level information for each document type.

At block 353, the method 350 includes splitting, by the data extraction system 101 the hierarchy configuration file 109 at document level. In an embodiment, based on the information such as document type and document Identifier (ID) 211, the hierarchy configuration file 109 is split at document level.

At block 355, the method 350 includes sending, by the data extraction system 101, the split hierarchy configuration file to the one or more data extractors. In an embodiment, the split hierarchy configuration files are then provided to the one or more data extractors for extraction of data attributes and data clauses.

At block 357, the method 350 includes executing, by the data extraction system 101, the one or more data extractors based on the data extractors configuration information file 215. In an embodiment, the one or more data extractors extract data attributes and data clauses from the split hierarchy configuration file for each document. The independent data extractors are executed in parallel, while the dependent data extractors are executed as per their execution order.

At block 359, the method 350 includes aggregating, by the data extraction system 101, the responses from the one or more data extractors. In an embodiment, the response from the one or more data extractors is received in a pre-defined format. After execution of all the data extractors, all the extracted attributes and received attributes and clauses are aggregated for the documents based on information such as document type and document ID 211. Further, using the split hierarchy configuration files related information it is ascertained that responses for all documents have been received from the one or more data extractors.

At block 361, the method 350 includes generating, by the data extraction system 101, a data attributes document 111. In an embodiment, the data extraction system 101 aggregates the information extracted by the one or more data extractors in a data attributes document 111 comprising extracted key data points, clauses, co-ordinate information and confidence level for attributes and/or clauses.

Computer System

Figure 4:
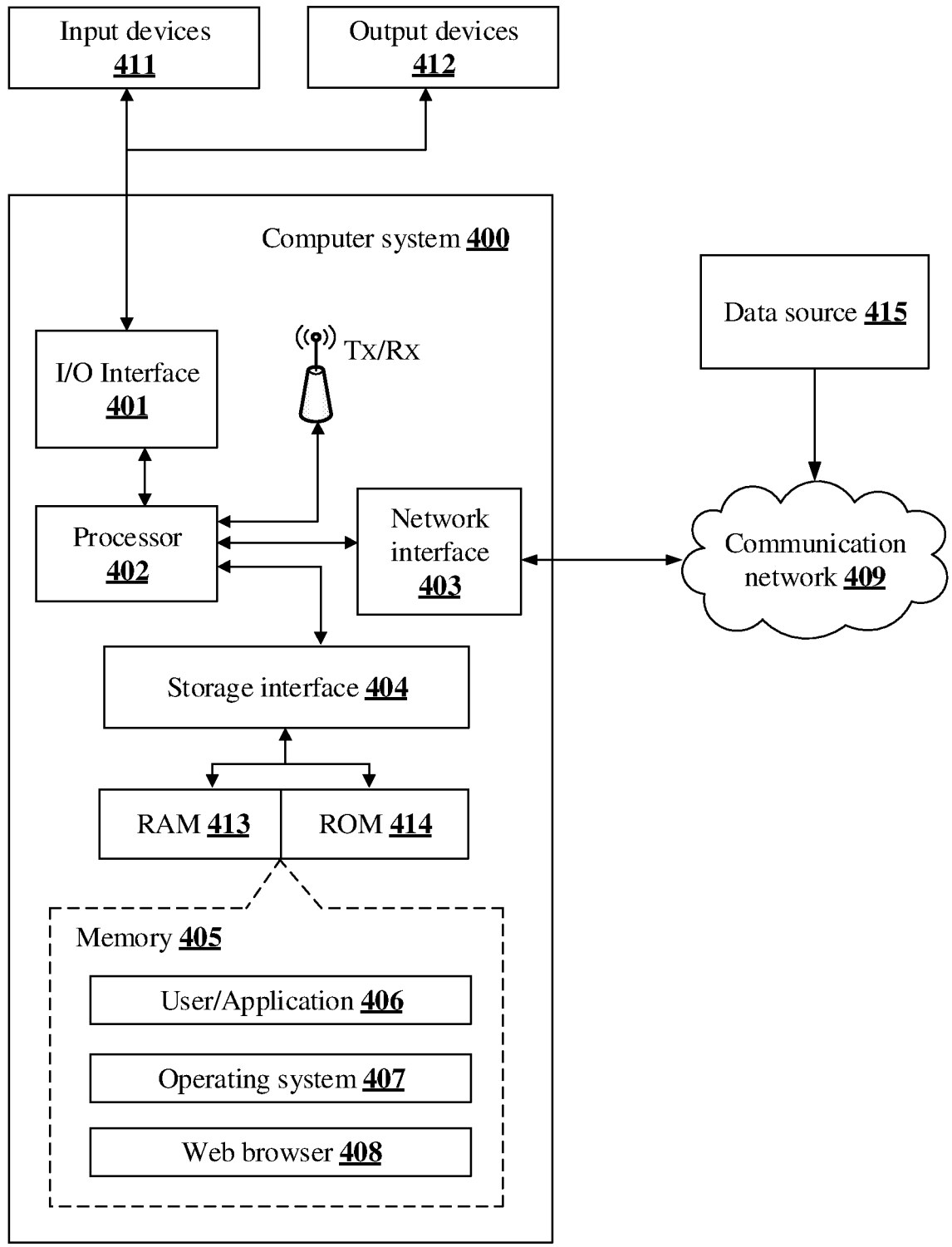
FIG. 4 illustrates a block diagram of an exemplary computer system for implementing embodiments consistent with the present disclosure.

FIG. 4 illustrates a block diagram of an exemplary computer system 400 for implementing embodiments consistent with the present disclosure. In an embodiment, the computer system 400 may be analogous to the data extraction system 101 illustrated in FIG. 2, which may be used for extracting information from an input document 103 comprising multi-format information. The computer system 400 may include a central processing unit ("CPU" or "processor" or "memory controller") 402. The processor 402 may comprise at least one data processor for executing program components for executing user- or system-generated business processes. A user may include an employee at a government office, an employee at an insurance office, any user who wants to extract information from the document or any system/sub-system being operated parallelly to the computer system 400. The processor 402 may include specialized processing units such as integrated system (bus) controllers, memory controllers/memory management control units, floating point units, graphics processing units, digital signal processing units, etc.

The processor 402 may be disposed in communication with one or more Input/Output (I/O) devices (411 and 412) via I/O interface 401 for receiving the input document 103. In some embodiments, the processor 402 may be disposed in communication with a communication network 409 via a network interface 403. The network interface 403 may communicate with the communication network 409. Using the network interface 403 and the communication network 409, the computer system 400 may connect with a data source 415, which may be used to store the input document 103.

In an implementation, the communication network 409 may be implemented as one of the several types of networks, such as intranet or Local Area Network (LAN) and such within the organization. The communication network 409 may either be a dedicated network or a shared network, which represents an association of several types of networks that use a variety of protocols.

In some embodiments, the processor 402 may be disposed in communication with a memory 405 (e.g., RAM 413, ROM 414, etc. as shown in FIG. 4) via a storage interface 404. The storage interface 404 may connect to memory 405 including, without limitation, memory drives, removable disc drives, etc.

The memory 405 may store a collection of program or database components, including, without limitation, user/application interface 406, an operating system 407, a web browser 408, and the like. In some embodiments, computer system 400 may store user/application data 406, such as the data, variables, records, etc. as described in this invention. Such databases may be implemented as fault-tolerant, relational, scalable, secure databases such as Oracle® or Sybase®.

The operating system 407 may facilitate resource management and operation of the computer system 400. The user interface 406 may facilitate display, execution, interaction, manipulation, or operation of program components through textual or graphical facilities.

The web browser 408 may be a hypertext viewing application. Secure web browsing may be provided using Secure Hypertext Transport Protocol (HTTPS), Secure Sockets Layer (SSL), Transport Layer Security (TLS), and the like. Advantages of the embodiments of the present disclosure are illustrated herein.

In an embodiment, the present disclosure helps in collating information from different file types. Consequently, the present disclosure helps processing varied sources of information with different types of formats which contains data in a structured or unstructured format.

In an embodiment, the present disclosure helps in understanding and demarcating multiple documents merged in one file. Also, the present disclosure helps in arranging the documents in a hierarchy if the documents are related and helps in extracting information from the input document. Further, the present invention uses logical breaking of input document in order to extract attributes and clauses effectively.

In an embodiment, the present disclosure helps in maintaining right context and flow of the input document to understand the input document and extract the correct attribute or clause information. In case there are multiple columns of text present within a single page, the present invention helps in understanding the layout of the input document.

In an embodiment, the present disclosure helps in optimizing and controlling flow of execution for multiple data extractors. Consequently, the claimed invention maintains both synchronous and asynchronous processes of the data extractors.

In light of the technical advancements provided by the disclosed method and the data extraction system, the claimed steps, as discussed above, are not routine, conventional, or well-known aspects in the art, as the claimed steps provide the aforesaid solutions to the technical problems existing in the conventional technologies. Further, the claimed steps clearly bring an improvement in the functioning of the system itself, as the claimed steps provide a technical solution to a technical problem.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

REFERRAL NUMERALS

| Reference Number | Description |
|---|---|
| 101 | Data extraction system |
| 103 | Input document |
| 105 | Hypertext Markup Language (HTML) document |
| 107 | Realigned Hypertext Markup Language (HTML) document |
| 109 | Hierarchy configuration file |
| 111 | Data attributes document |
| 201 | I/O Interface |
| 203 | Processor |
| 205 | Memory |
| 207 | Data |
| 209 | Modules |
| 211 | Document identifier (ID) |
| 215 | Data extractor configuration information file |
| 217 | Other data |
| 219 | Data preprocessor module |
| 221 | File creation module |
| 223 | Realignment module |
| 225 | Determination module |

-continued

| Reference Number | Description |
|---|---|
| 227 | Hierarchy generation module |
| 231 | Orchestration module |
| 233 | Other modules |
| 400 | Exemplary computer system |
| 401 | I/O Interface of the exemplary computer system |
| 402 | Processor of the exemplary computer system |
| 403 | Network interface |
| 404 | Storage interface |
| 405 | Memory of the exemplary computer system |
| 406 | User/Application |
| 407 | Operating system |
| 408 | Web browser |
| 409 | Communication network |
| 411 | Input devices |
| 412 | Output devices |
| 413 | RAM |
| 414 | ROM |
| 415 | Data source |

What is claimed is:

1. A method for extracting information from an input document comprising multi-format information, the method comprising:

creating, by a data extraction system, a Hypertext Markup Language (HTML) document corresponding to the input document,
wherein the input document comprises at least two documents merged as one file, and wherein the at least two documents is of different data formats, each of the at least two documents having one or more pages;

realigning, by the data extraction system, the HTML document based on a number of columns and spatial information of the words of the HTML document;

determining, by the data extraction system, a document Identifier (ID) associated with each of the at least two documents in the realigned HTML document by classifying information each of the at least two document pages using a pretrained Machine Learning (ML) model;

generating, by the data extraction system, a hierarchy configuration file comprising: (i) free flowing text of the at least two documents along with (ii) each document ID associated with the at least two documents, corresponding to the realigned HTML document, based on each document ID associated with the at least two documents, by:

extracting all lines for each document in the realigned HTML document based on each document ID associated with the at least two documents;

determining a category to each line based on a plurality of text features of one or more lines above and below each line, wherein the category comprises a main heading, a sub-heading, a sub-section, a paragraph, a sub-paragraph or a combination thereof; and generating the hierarchy configuration file, by grouping or separating the one or more lines of the at least two documents, according to the determined category, wherein the hierarchy configuration file is splitable at document level based on each document ID; and extracting, by the data extraction system, information from the hierarchy configuration file associated with each document ID by orchestrating one or more data extractors for extracting data attributes from the hierarchy configuration file, wherein the one or more data extractors comprises at least one of one or more dependent data extractors and one or more independent data extractors.

2. The method as claimed in claim 1, wherein
when the input document is a text document, creating the HTML document directly from text portions of the input document; and
wherein when the input document is a scanned document, converting the information in each page of the input document into one or more images;
performing one or more data pre-processing operations on each of the one or more images for validating the information, wherein the one or more data pre-processing operations comprises assessing a quality of the one or more images, detecting a text region and a non-text region in the one or more images and recognizing characters in the text portion of the one or more images; and
rendering the information into the HTML document.

3. The method as claimed in claim 1, wherein the number of columns in the HTML document is determined by:
cropping a predefined region in the HTML document;
calculating a distance between two consecutive words based on predefined text metadata;
creating a plurality of clusters of words based on a mean and a standard deviation of the distance; and
predicting the number of columns in the HTML document by analyzing the plurality of clusters using the pretrained ML model.

4. The method as claimed in claim 1, wherein realigning the HTML document further comprises:
sorting one or more words in the HTML document from left-to-right and top-to-bottom based on properties associated with each of the one or more words for determining line information;
predicting if the one or more words is a starting word of a line within each column by analyzing the line information using the pretrained ML model; and
creating the realigned HTML document using the line information and the start word.

5. The method as claimed in claim 1, wherein generating the hierarchy configuration file further comprises:
determining the plurality of text features for each line in the realigned HTML document, upon extracting all lines for each document, wherein the plurality of text features comprises co-ordinate of line, indentations, change in font style, boldness, line height information, uppercase letters, lowercase letters, special characters, and numbers in starting lines;
determining using the pretrained ML model, at least one heading category to each line based on the plurality of text features corresponding to each line; and
arranging each line according to determined heading category and generating the hierarchy configuration file according to arrangement of each line.

6. The method as claimed in claim 1, wherein extracting the information from the hierarchy configuration file comprises:
determining the one or more extractors for extracting information from the hierarchy configuration file based on each document ID;
splitting the hierarchy configuration file into a plurality of split hierarchy configuration files corresponding to each document ID;
extracting one or more text attributes, one or more image attributes and one or more text clauses from the plurality of split hierarchy configuration files;
orchestrating between the one or more extractors based on each document ID identified in the plurality of split hierarchy configuration files, wherein the plurality of extractors include one or more Machine Learning (ML) based extractors and one or more rule-based extractors; and
aggregating the information extracted by each of the the one or more of extractors into an output document.

7. A data extraction system for extracting information from an input document comprising multi-format information, the data extraction system comprising:
a processor; and
a memory, communicatively coupled to the processor, wherein the memory stores processor-executable instructions, which, on execution, causes the processor to:
create a Hypertext Markup Language (HTML) document corresponding to the input document,
wherein the input document comprises at least two documents merged as one file, and wherein the at least two documents is of multiple different data formats;
realign the HTML document based on a number of columns and spatial information of the words of the HTML document;
determine a document Identifier (ID) associated with each of the at least two documents in the realigned HTML document by classifying information in each of the at least two documents using a pretrained Machine Learning (ML) model;
generate a hierarchy configuration file comprising: (i) free flowing text of the at least two documents along with (ii) each document ID associated with the at least two documents, corresponding to the realigned HTML document based on each document ID associated with the at least two documents, by:
extracting all lines for each document in the realigned HTML document based on each document ID associated with the at least two documents;
determining a category to each line based on a plurality of text features of one or more lines above and below each line, wherein the category comprises a main heading, a sub-heading, a sub-section, a paragraph, a sub-paragraph or a combination thereof; and
generating the hierarchy configuration file, by grouping or separating the one or more lines of the at least two documents, according to the determined category,
wherein the hierarchy configuration file is splitable at document level based on each document ID; and
extract information from the hierarchy configuration file associated with each of document ID by orchestrating one or more data extractors for extracting data attributes from the hierarchy configuration file, wherein the one or more data extractors comprises at least one of one or more dependent data extractors and one or more independent data extractors.

8. The data extraction system as claimed in claim 7, wherein
when the input document is a text document, creating the HTML document directly from text portions of the input document; and
wherein when the input document is a scanned document, converting the information in each page of the input document into one or more images;
performing one or more data pre-processing operations on each of the one or more images for validating the information, wherein the one or more data preprocessing operations comprises assessing a quality of the one or more images, detecting a text region and a non-text region in the one or more images and recognizing characters in the text portion of the one or more images; and
rendering the information into the HTML document.

9. The data extraction system as claimed in claim 7, wherein the number of columns in of the HTML document is determined by:
cropping a predefined region in the HTML document;
calculating a distance between two consecutive words based on predefined text metadata;
creating a plurality of clusters of words based on a mean and a standard deviation of the distance; and
predicting the number of columns in the HTML document by analyzing the plurality of clusters using the pre-trained ML model.

10. The data extraction system as claimed in claim 7, wherein realigning the HTML document further comprises:
sorting one or more words in the HTML document from left-to-right and top-to-bottom page based on properties associated with each of the one or more words for determining line information;
predicting if the one or more words is a starting word of a line within each column by analyzing the line information using the pretrained ML model; and
creating the realigned HTML document using the line information and the start word.

11. The data extraction system as claimed in claim 7, wherein generating the hierarchy configuration file further comprises:
determining the plurality of text features for each line in the realigned HTML document, upon extracting all lines for each document, wherein the plurality of text features comprises co-ordinate of line, indentations, change in font style, boldness, line height information, uppercase letters, lowercase letters, special characters, and numbers in starting lines;
determining using the pretrained ML model, at least one heading category to each line based on the plurality of text features corresponding to each line; and
arranging each line according to determined heading category and generating the hierarchy configuration file according to arrangement of each line.

12. The data extraction system as claimed in claim 7, wherein extracting the information from the hierarchy configuration file comprises:
determining the one or more of extractors for extracting information from the hierarchy configuration file based on document type and each document ID of the at least two documents;
splitting the hierarchy configuration file into a plurality of split hierarchy configuration files corresponding to each document ID;
extracting one or more text attributes, one or more image attributes and one or more text clauses from the plurality of split hierarchy configuration files;
orchestrating between the one or more of extractors based on each document ID identified in the plurality of split hierarchy configuration files, wherein the plurality of extractors include one or more Machine Learning (ML) based extractors and one or more rule-based extractors; and
aggregating the information extracted by each of the the one or more of extractors into an output document.

13. A non-transitory computer readable medium including instructions stored thereon that when processed by at least one processor, cause a data extraction system to perform operations comprising:
creating a Hypertext Markup Language (HTML) document corresponding to the input document,
wherein the input document comprises at least two documents merged as one file, and wherein the at least two documents is of different data formats, each of the at least two documents having one or more pages;
realigning the HTML document based on a number of columns and spatial information of the words of the HTML document;;
determining a document Identifier (ID) associated with each of the at least two documents in the realigned HTML document by classifying information each of the at least two document pages using a pretrained Machine Learning (ML) model;
generating a hierarchy configuration file comprising: (i) free flowing text of the at least two documents along with (ii) each document ID associated with the at least two documents, corresponding to the realigned HTML document, based on each document ID associated with the at least two documents, by:
extracting all lines for each document in the realigned HTML document based on each document ID associated with the at least two documents;
determining a category to each line based on a plurality of text features of one or more lines above and below each line, wherein the category comprises a main heading, a sub-heading, a sub-section, a paragraph, a sub-paragraph or a combination thereof; and
generating the hierarchy configuration file, by grouping or separating the one or more lines of the at least two documents, according to the determined category, wherein the hierarchy configuration file is splitable at document level based on each document ID; and
extracting information from the hierarchy configuration file associated with each of tho document ID by orchestrating one or more data extractors for extracting data attributes from the hierarchy configuration file, wherein the one or more data extractors comprises at least one of one or more dependent data extractors and one or more independent data extractors.

14. The non-transitory computer readable medium as claimed in claim 13, wherein
when the input document is a text document, creating the HTML document directly from text portions of the input document; and
wherein when the input document is a scanned document, converting the information in each page of the input document into one or more images;
performing one or more data pre-processing operations on each of the one or more images for validating the information, wherein the one or more data pre-processing operations comprises assessing a quality of the one or more images, detecting a text region and a non-text region in the one or more images and recognizing characters in the text portion of the one or more images; and
rendering the information into the HTML document.

15. The non-transitory computer readable medium as claimed in claim 13, wherein the number of columns in of the HTML document is determined by:
cropping a predefined region in the HTML document;

calculating a distance between two consecutive words based on predefined text metadata;

creating a plurality of clusters of words based on a mean and a standard deviation of the distance; and predicting the number of columns in the HTML document by analyzing the plurality of clusters using the pretrained ML model.

16. The non-transitory computer readable medium as claimed in claim 13, wherein realigning the HTML document further comprises:

sorting one or more words in the HTML document from left-to-right and top-to-bottom based on properties associated with each of the one or more words for determining line information;

predicting if the one or more words is a starting word of a line within each column by analyzing the line information using the pretrained ML model; and creating the realigned HTML document using the line information and the start word.

17. The non-transitory computer readable medium as claimed in claim 13, wherein generating the hierarchy configuration file comprises:

determining the plurality of text features for each line in the realigned HTML document, upon extracting all lines for each document, wherein the plurality of text features comprises co-ordinate of line, indentations, change in font style, boldness, line height information, uppercase letters, lowercase letters, special characters, and numbers in starting lines;

determining using the pretrained ML model, at least one heading category to each line based on the plurality of text features corresponding to each line; and arranging each line according to determined heading category and generating the hierarchy configuration file according to arrangement of each line.

18. The non-transitory computer readable medium as claimed in claim 13, wherein extracting the information from the hierarchy configuration file comprises:

determining the one or more extractors for extracting information from the hierarchy configuration file based on each document ID;

splitting the hierarchy configuration file into a plurality of split hierarchy configuration files corresponding to each document ID;

extracting one or more text attributes, one or more image attributes and one or more text clauses from the plurality of split hierarchy configuration files;

orchestrating between the one or more extractors based on each document ID identified in the plurality of split hierarchy configuration files, wherein the plurality of extractors include one or more Machine Learning (ML) based extractors and one or more rule-based extractors; and aggregating the information extracted by each of the the one or more of extractors into an output document.

* * * * *